(12) United States Patent
Kiriki et al.

(10) Patent No.: US 6,349,083 B1
(45) Date of Patent: Feb. 19, 2002

(54) NEAR FIELD TYPE OPTICAL DISK RECORDING REPRODUCING APPARATUS, OPTICAL INFORMATION RECORDING MEDIUM RECORDING REPRODUCING APPARATUS, PICKUP APPARATUS, OBJECTIVE LENS

(75) Inventors: Toshihiko Kiriki; Kohei Ota, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/351,369

(22) Filed: Jul. 12, 1999

(30) Foreign Application Priority Data

Jul. 13, 1998 (JP) .......................................... 10-212052
Jul. 21, 1998 (JP) .......................................... 10-204998

(51) Int. Cl.[7] .................................................. G11B 7/00
(52) U.S. Cl. ............................. 369/112.23; 369/112.08; 369/112.25; 369/44.23; 359/719
(58) Field of Search ...................... 369/112.08, 112.26, 369/112.13, 44.23, 112.07, 112.23, 112.25; 359/15, 16, 19, 356, 375, 565, 571, 575, 708, 710, 718, 721, 743, 719, 724, 570, 589

(56) References Cited

U.S. PATENT DOCUMENTS

| | | | | |
|---|---|---|---|---|
| 5,633,852 A | * | 5/1997 | Maruyama et al. | 369/112.08 |
| 5,724,335 A | * | 3/1998 | Kobayashi | 369/112.08 |
| 5,790,503 A | * | 8/1998 | Mizuno et al. | 369/112.1 |
| 5,835,283 A | * | 11/1998 | Yamanaka | 369/44.23 |
| 5,978,139 A | * | 11/1999 | Hatakoshi et al. | 369/112.08 |
| 6,061,324 A | * | 5/2000 | Arai et al. | 369/112.26 |
| 6,088,322 A | * | 7/2000 | Broome et al. | 369/112.26 |

* cited by examiner

Primary Examiner—Thang V. Tran
(74) Attorney, Agent, or Firm—Finnegan, Henderson, Farabow, Garrett & Dunner, L.L.P.

(57) ABSTRACT

In a near field type optical disk recording and/or reproducing apparatus, provided with a light source; an objective single lens to converse light from the light source to a focusing point; an optical disk; and a rotating device to rotate the optical disk; the objective lens has a first surface at the light source side and a second surface at the focusing point side, and the first surface is a curved surface on which a diffraction surface is provided.

25 Claims, 11 Drawing Sheets

NEAR FIELD TYPE OPTICAL DISK RECORDING REPRODUCING APPARATUS, OPTICAL INFORMATION RECORDING MEDIUM RECORDING REPRODUCING APPARATUS, PICKUP APPARATUS, OBJECTIVE LENS

BACKGROUND OF THE INVENTION

The present invention relates to an apparatus to record or reproduce recording information in an optical information recording medium and to an objective lens and a pickup apparatus for use in the apparatus. Further, the present innovation relates to a near field type optical disk recording reproducing apparatus in which a distance between an objective lens and a recording surface of an optical disk is smaller than an order of a wavelength of light and to an objective lens and a pickup apparatus for use in the apparatus. In particular, the present invention relates to an recording reproducing apparatus in which NA (numerical aperture) is larger and a high density recording is conducted.

In a high density recording reproducing apparatus in which an optical disk is used as an optical information recording medium, an apparatus using a near field type optical system is suggested.

In such an objective lens in the near field type optical system, U.S. Pat. No. 5,125,750 discloses an optical system in which two pieces of separated lenses having a uniform refractive index are used, in particular, a hemisphere lens is used as a lens at the optical disk side.

In this optical system, since a precise optical system having a larger NA is constructed with the two pieces of lenses, many manufacturing processes are needed for assembling and adjustment. Further, a minute size lens is produced by polishing. As a result, the cost for this optical system becomes very high.

Further, in a recording reproducing apparatus for various optical information recording medium such as a compact disk (CD), a digital video disk (DVD), a mini disk (MD), and a magneto-optics disk (MO), due to the reason that the cost may be reduced, an objective lens made of plastic is used. Also, as an objective lens for use in a near field type optical system, there may be a possibility that a plastic lens is used.

However, although the objective lens made of plastic may be produced at low cost, there may be a problem that a focusing point is shifted due to a change in temperature.

SUMMARY OF THE INVENTION

With a simple structure, the present invention is to obtain an optical system for recording or reproducing a high density optical information recording medium, wherein the optical system has an excellent image forming performance as a near field type optical system and can be easily assembled and adjusted.

Further, an object of the present innovation is to provide an objective lens for use in an optical pickup device, wherein the objective lens is made of plastic material and a shift of a focusing point due to a change in temperature is small, in particular, to provide an objective lens for use in an optical pickup apparatus, wherein a shift of a focusing point due to a change in temperature is kept within a depth of focus even if a numerical aperture at the image side is larger than 0.5.

The above object may be attained by the following structures.

(1) A near field type optical disk recording/reproducing apparatus, comprises
a light source;
an objective single lens to converse light from the light source to a focusing point;
an optical disk; and
a rotating device to rotate the optical disk;
wherein the objective lens has a first surface at the light source side and a second surface at the focusing point side, and the first surface is a curved surface on which a diffraction surface is provided.

(2) In the near field type optical disk recording reproducing apparatus of (1), the first surface is an aspherical surface.

(3) In the near field type optical disk recording reproducing apparatus of (1), the second surface is a flat surface.

(4) In the near field type optical disk recording reproducing apparatus of (1), the diffraction surface is notched in a form of a ring.

(5) In the near field type optical disk recording reproducing apparatus of (1), the following formula is satisfied, $$(1-1/n) < R_0/d < (1+1/n)$$

wherein n is a refractive index of the objective lens, $R_0$ is a paraxial curvature radius of the objective lens, and d is a thickness of the objective lens on the optical axis.

(6) In the near field type optical disk recording reproducing apparatus of (1), the following formula is satisfied, $$(1-1/n) < R_0/(n \cdot f) < (1+1/n)$$

wherein n is a refractive index of the objective lens, $R_0$ is a paraxial curvature radius of the objective lens, and f is a focal length of the objective lens.

(7) In the near field type optical disk recording reproducing apparatus of (1), the following formula is satisfied, $$0.3 \times (1-3/vd) < (n-1)/R_0 < 1/f$$

wherein n is a refractive index of the objective lens, $R_0$ is a paraxial curvature radius of the objective lens, f is a focal length of the objective lens, and vd is Abbe's number of the objective lens.

(8) In the near field type optical disk recording reproducing apparatus of (1), the following formula is satisfied, $$0.4 \times (1-3/vd) < (n-1)/R_0 < 1.2 \times (1-3/vd)$$

wherein n is a refractive index of the objective lens, $R_0$ is a paraxial curvature radius of the objective lens, f is a focal length of the objective lens, and vd is Abbe's number of the objective lens.

(9) In the near field type optical disk recording reproducing apparatus of (1), the following formula is satisfied, $$vd < 40$$

wherein vd is Abbe's number of the objective lens.

(10) In the near field type optical disk recording reproducing apparatus of (1), further comprising a collimator lens, chromatic aberration of the objective lens is corrected excessively and chromatic aberration of the collimator lens is corrected insufficiently, whereby chromatic aberration of the entire optical system is corrected properly.

(11) A pickup apparatus for use in a near field type optical disk recording reproducing apparatus, comprises a light source; and
an objective single lens to converse light from the light source to a focusing point;
wherein the objective lens has a first surface at the light source side and a second surface at the focusing point side, and the first surface is a curved surface on which a diffraction surface is provided.

(12) An objective lens for use in a near field type optical disk recording reproducing apparatus, wherein the objective single lens converses light from a light source to a focusing point, comprises
a first surface at the light source side, and
a second surface at the focusing point side, wherein the first surface is a curved surface on which a diffraction surface is provided.

(13) In a near field type optical disk optical system, the optical system is characterized in that an objective lens is a single lens, its light source side is a curved surface, a ring of a diffracting lens is notched on the curved surface.

(14) In the optical system of (13), the curved surface is an aspherical surface.

(15) In the optical system of (13), the focusing point side of the objective lens is a flat surface.

(16) In the optical system of (13), the following formula is satisfied:

$$(1-1/n) < R_0/d < (1+1/n)$$

wherein the curved surface is an aspherical surface, its paraxial curvature radius R is $R_0$ a thickness of the single lens on the optical axis is d, and a refractive index is n.

As stated above, in a near field type optical disk optical system, the optical system of the present invention comprises an objective lens which is a single lens whose light source side is a curved surface, preferably, an aspherical surface. It may be preferable that a ring of a diffracting lens is notched on the curved surface. It may be preferable that a surface at the focusing point side is a flat surface. It may be preferable that the objective lens is shaped in a flat convex lens as a whole.

If the objective lens of the near field type optical disk optical system is formed by a general flat convex lens which does not includes a diffracting lens on its convex surface, and if an aspherical surface is used as the convex lens, spherical aberration can be corrected well and a image forming capability on the optical axis can keep a good condition having no aberration. However, for a light flux in field angle of ±1°, the image forming capability is deteriorated greatly. This is because, with the flat convex lens having only refraction, a sine condition is very bad.

To counter the deterioration, the function to convert an incident light into a conversed light on the convex surface at its light source side is allotted not only to the refraction, but also to a diffracting power, whereby the curvature of the convex surface can be made loose and the sine condition becomes good. As a result, even for a light flux in field angle of ±1°, the good image forming capability can be maintained.

(17) An optical information recording medium recording reproducing apparatus, comprises
a light source; and
a objective lens of a single lens to converse light from the light source to a focusing point;
wherein the objective lens is made of plastic and comprises a first surface and a second surface opposite to the first surface, and at least one of the first surface and the second surface includes a diffraction surface, and
wherein the objective lens satisfies the following formula:

$$0.4-(63\ \psi\cdot\lambda/NA^2) \leq \psi_D/\psi \leq 0.8+(63\ \psi\cdot\lambda/NA^2)$$

where $\psi$ is a power of the entire system of the objective lens, $\psi_D$ is the sum of the power of the diffraction surface of the first surface and the power of the diffraction surface of the second surface, $\lambda$ is a wavelength of the light source, and NA is a numerical aperture at the image side of the objective lens.

(18) In the optical information recording medium recording reproducing apparatus of (17), the diffraction surface is notched in the form of a ring.

(19) In the optical information recording medium recording reproducing apparatus of (17), the diffraction surface is a blaze type diffraction surface.

(20) In the optical information recording medium recording reproducing apparatus of (19), the numerical aperture at the image side of the objective lens is larger than 0.5, the diffraction surface is provided at the longer conjugate side, and the following formula is satisfied:

$$0.2NA-(32\psi\cdot\lambda/NA) \leq m\cdot\lambda P_{min} \leq 2.6NA+(200\psi\cdot\lambda/NA)$$

where $P_{min}$ is the minimum pitch of the blazes of the objective lens in a direction perpendicular to the optical axis, and m is a diffraction order of the blazes.

(21) In the optical information recording medium recording reproducing apparatus of (19), the diffraction surface is shaped in the form of blazes such that the diffraction efficiency becomes the largest for the diffracting light having an order number larger than the second order.

(22) A pickup apparatus for use in an optical information recording medium recording reproducing apparatus, comprises
a light source; and
a objective lens of a single lens to converse light from the light source to a focusing point;
wherein the objective lens is made of plastic and comprises a first surface and a second surface opposite to the first surface, and at least one of the first surface and the second surface includes a diffraction surface, and
wherein the objective lens satisfies the following formula:

$$0.4-(63\psi\cdot\lambda/NA^2) \leq \psi/\psi_D \leq 0.8+(63\psi\cdot\lambda/NA^2)$$

where $\psi$ is a power of the entire system of the objective lens, $\psi_D$ is the sum of the power of the diffraction surface of the first surface and the power of the diffraction surface of the second surface, $\lambda$ is a wavelength of the light source, NA is a numerical aperture at the image side of the objective lens.

(23) An objective lens for use in an optical information recording medium recording reproducing apparatus, comprises
a objective lens having a first surface and a second surface opposite to the first surface;
wherein the objective lens is made of plastic and at least one of the first surface and the second surface includes a diffraction surface, and wherein the objective lens satisfies the following formula:

$$0.4-(63\psi\cdot\lambda/NA^2)\leq\psi/\psi_D\leq 0.8+(63\psi\cdot\lambda/NA^2)$$

where $\psi$ is a power of the entire system of the objective lens, $\psi_D$ is the sum of the power of the diffraction surface of the first surface and the power of the diffraction surface of the second surface, $\lambda$ is a wavelength of the light source, NA is a numerical aperture at the image side of the objective lens.

(24) In an objective lens of a single lens for use in a pickup for an optical recording reproducing apparatus, the objective lens for pickup is characterized in that the objective lens is made of plastic, a blazed type diffraction surface in which a saw tooth-shaped level difference is made in the form of a ring is provided on at least one of a first surface and a second surface, and the following formula is satisfied:

$$0.4-(63\psi\cdot\lambda/NA^2)\leq\psi_D/\psi\leq 0.8+(63\ \psi\cdot\lambda/NA^2)$$

where $\psi$ is a power of the entire system, $\psi_D$ is the sum of the power of the diffraction surface of the first surface and the power of the diffraction surface of the second surface, $\lambda$ is a wavelength, and NA is a numerical aperture at the image side.

(25) In the objective lens for pickup of (24), the numerical aperture at the image side of the objective lens is larger than 0.5, the diffraction surface is provided at the longer conjugate side, and the following formula is satisfied:

$$0.2NA-(32\psi\cdot\lambda/NA)\leq m\cdot\lambda P_{min}\leq 2.6NA+(200\psi\cdot\lambda/NA)$$

where $P_{min}$ is the minimum pitch of the blazes of the objective lens in a direction perpendicular to the optical axis, and m is a diffraction order of the blazes.

(26) In the objective lens for pickup of (24), the diffraction surface is shaped in the form of blazes such that the diffraction efficiency becomes the largest for the diffracting light having an order number larger than or equal the second order.

DETAILED DESCRIPTION OF THE PREFERRED EMBODIMENT

Figure 17:
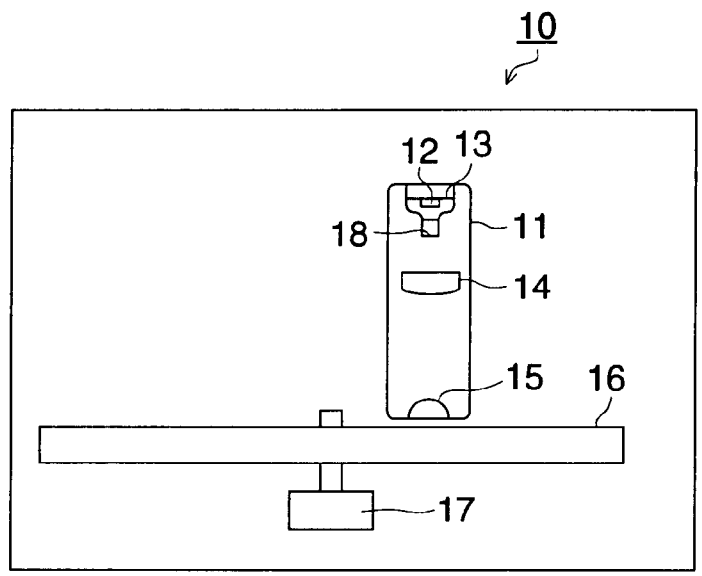
FIG. 17 is a sectional view showing a near field type optical disk recording reproducing apparatus.

At first, a near field type optical disk recording reproducing apparatus is explained with reference to FIG. 17. Needless to say, the near field type optical disk recording reproducing apparatus of the present invention is not limited to the embodiment shown in FIG. 17.

The near field type optical disk recording reproducing apparatus 10 comprises a pickup apparatus 11 which is shiftable, a near field type optical disk 16 (an optical disk for use in a near field), and a rotating means 17 for rotating the near field type optical disk 16.

The pickup apparatus 11 comprises a light source 12 such as a semiconductor laser, a beam splitter 18, a collimator lens 14, a near field type objective lens 15 (an objective lens for use in a near field) and a optical detecting device 13.

The near field type optical disk 16 has not a protective layer so that a information recording surface is exposed. The near field type objective lens 15 is positioned very close to the information recording surface of the near field type optical disk. It may be preferable that a distance between the near field type objective lens 15 and the information recording surface of the near field type optical disk is smaller than 10 $\mu$m, preferably, smaller than 1 $\mu$m, and more preferably, smaller than an order of a wavelength of light of the light source.

Figure 18:
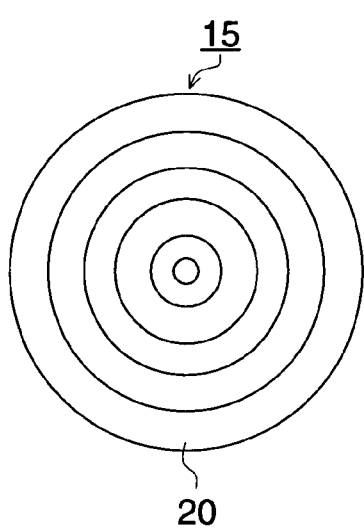
FIGS. 18(a) and 18(b) each is a sectional view showing a near field type objective lens.
Figure 18:
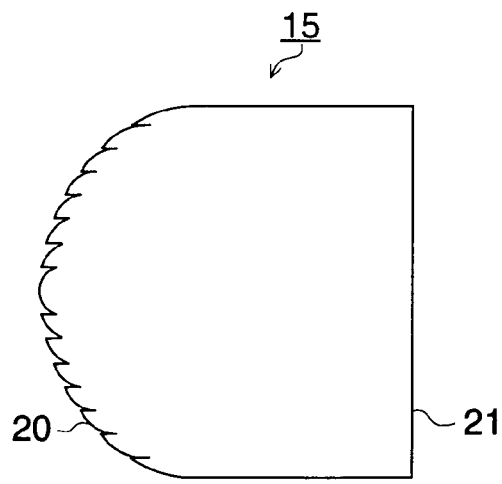

The near field type objective lens 15 comprises a first surface 20 at its light source side and a second surface 21 at its image side as shown in FIG. 18(b). The first surface 20 is shaped in a curved surface, preferably, an aspherical surface and includes a diffraction surface. Preferably, as shown in FIGS. 18(a) and 18(b), the first surface 20 is provided with a concentric ring-shaped blazed type diffraction surface which is a phase type and a relief type.

Further, although the diffraction surface may be provided on a part of the first surface 20, it may be preferable to provide the diffraction surface on the entire surface of the first surface 20. It may be preferable to shape the second surface 21 in a flat surface. Also, the diffraction surface may be provided with a shape that a part of the concentric ring is cut out. Incidentally, FIGS. 18(a) and 18(b) are illustrated with exaggeration for easy comprehension. Accordingly, FIGS. 18(a) and 18(b) are not illustrated with a precisely reduced scale. It may be preferable that the focusing point of the near field type objective lens is positioned on the second surface of the lens or within ±2 $\mu$m from the second surface. It may be more preferable that the focusing point of the near field type objective lens is positioned on the second surface of the lens.

Hereinafter, operations in the present apparatus are explained. a light flux emitted from a light source 12 in the pickup apparatus 11 passes through the beam splitter 18 and the collimator lens 14, thereby being shaped in a parallel light flux. The parallel light flux are introduced into the near field type objective lens 15. The near field type objective lens 15 converges the incident light flux so as to focus it at a position near the second surface 21 of the objective lens. That is, the light flux is focused on the information recording surface of the near field type optical disk 16 rotated by the rotating means 17. By this focused light, recording or reproducing information is conducted.

The light reflected from the information recording surface of the near field type optical disk 16 passes again through the objective lens 15, the collimator lens 14 and the beam splitter 18 and is introduced into the optical detecting device 13, whereby reading information is conducted.

The pickup apparatus 11 is shifted in a direction along the radius of the optical disk 16 by a shifting means (not shown in the drawings) and conducts the recording reproducing information while being shifted.

Incidentally, a constant distance between the objective lens 15 and the information recording surface of the optical disk 16 is maintained by the action that the optical disk 16 floats in air by its rotation.

Next, the objective lens of the present invention is explained in detail.

For an almost parallel light flux, it may be preferable that a diffraction lens having rings shaped symmetrically with regard to the optical axis is formed on an light source-side surface on which a refracting surface of an aspherical surface is used as a mother surface.

With this diffraction lens, the light is focused with no aberration on the surface at the flat surface side at the focusing point side.

In the optical system of the present innovation, it may be preferable in the point of improving a sine condition of the lens that the refracting power and the diffracting power are distributed on the light source-side surface such that the mother surface on the refracting surface is shaped in almost concentric with regard to the focusing point.

That is, when a paraxial curvature radius R is "$R_0$", a thickness of a single lens on the optical axis is "d", the refractive index of the single lens with a primary wavelength is "n", it may be preferable that $$(1-1/n) < R_0/d < 0.7 \times (1+1/n) \tag{1}$$

By making the value $R_0/d$ so as to satisfy the formula (1), sine condition can be corrected more and the offaxis performance of the lens can becomes more preferably.

Further, it may be more preferable in the point of correcting the sine condition that the above condition satisfies the following formula:

$$1.05 \times (1-1/n) < R_0/d < 0.7 \times (1+1/n) \tag{2}$$

When the surface at the light source side is an aspherical surface, a paraxial curvature radius R is "$R_0$", the focal length of a single lens is "f", and the refractive index of the single lens is "n", it may be preferable to satisfy the following formula:

$$(1-1/n) < R_0/(n \cdot f) < 0.7 \times (1+1/n) \tag{3}$$

By making the value $R_0/(n \cdot f)$ so as to satisfy the formula (3), sine condition can be corrected more and the offaxis performance of the lens can becomes more preferably.

Further, it may be more preferable in the point of correcting the sine condition that the above condition satisfies the following formula:

$$1.05 \times (1-1/n) < R_0/(n \cdot f) < 0.7 \times (1+1/n) \tag{54}$$

Further, in the optical system of the present invention, it may be preferable that an objective lens for use in a recording reproducing optical system for a near field type optical disk is an achromatic optical system, because the shift of the focusing point for a change in the wavelength of the light source is very small. As the condition for this, when the above curved surface is an aspherical surface, its paraxial curvature radius R is "$R_0$", the refractive index is "n", and Abbe's number is "vd", it may be preferable to satisfy the following formula:

$$0.3 \times (1-3/vd) < (n-1)/R_0 < 1/f \tag{5}$$

By making the value $(n-1)/R_0$ so as to satisfy the formula (5), chromatic aberration can be corrected more preferably.

Likewise, as the condition for correcting the chromatic aberration, it may be preferable to satisfy the following formula:

$$0.4 \times (1-3/vd) < (n-1)/R_0 < 1.2 \times (1-3/vd) \tag{6}$$

By making the value $(n-1)/R_0$ so as to satisfy the formula (6), chromatic aberration can be corrected more preferably.

Although the single lens of the present invention conducts an achromatic function by both of the refracting power of a positive lens and the diffracting power of a positive lens, since the equivalent Abbe's number of the diffracting power is small such as about −3, it may be preferable in order to make the correction for both of the sine condition and the achromatic easy that the Abbe's number vd is small so as to satisfy the following formula:

$$vd < 40 \tag{7}$$

and, more preferably, to satisfy the following formula:

$$vd < 30 \tag{8}$$

In the above formula, if the value of "vd" becomes larger than the upper limit respectively, the sine condition may be corrected insufficiently when the chromatic aberration is corrected, on the other hand, the chromatic aberration may be corrected excessively when the sine condition is corrected.

In the objective lens of the present invention, when the sine condition is corrected very well, the chromatic aberration may be generally corrected excessively. However, by correcting the chromatic aberration for the collimator used in combination with the objective lens insufficiently, it may be possible to correct the chromatic aberration as a whole for the optical system very well.

Next, an optical information recording medium recording reproducing apparatus is explained with reference to FIG. 19. The optical information recording medium recording reproducing apparatus of the present invention is not limited to the embodiment shown in FIG. 19.

Figure 19:
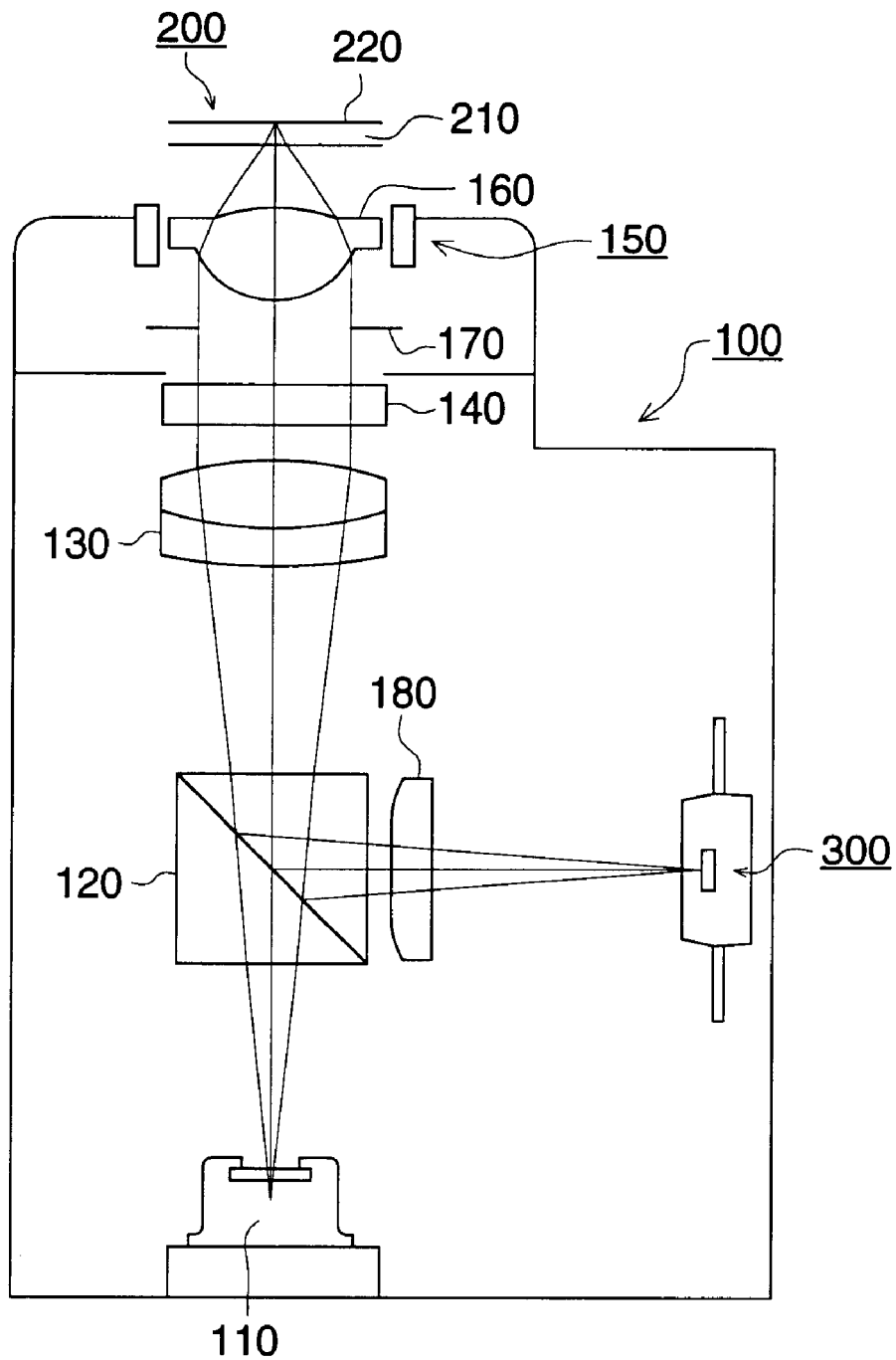
FIG. 19 is a sectional view showing an optical information recording medium recording reproducing apparatus.

An apparatus shown in FIG. 19 is an optical pickup apparatus for use in the optical information recording medium recording reproducing apparatus. Besides the optical pickup apparatus, the optical information recording medium recording reproducing apparatus comprises a means for rotating an optical information recording medium, and a means for driving the pickup apparatus, though not shown in the drawings.

The present invention is applicable to various optical information recording medium recording reproducing apparatus. For example, the present invention is applicable to a recording reproducing apparatus for a compact disk (CD), a CD-R, a laser disk (LD), a mini disk (MD), a magneto-optics disk (MO), and a digital video disk (DVD), and also applicable to a compatible recording reproducing apparatus capable of recording or reproducing plural optical information recording mediums indicated above. Further, the present invention is applicable to a near field optical recording reproducing apparatus whose embodiment is different from the optical pickup apparatus shown in FIG. 19.

The optical pickup apparatus 100 shown in FIG. 19 comprises a semiconductor laser 110 as a light source, a polarization beam splitter 120, a collimator lens 130, ¼ wave plate 140, a diaphragm 170, an objective lens 160, a cylindrical lens which is an astigmatism element to generate astigmatism, an optical detecting device 300, and a two dimensional actuator 150 for a focus control and a tracking control.

A light flux emitted from the semiconductor laser 110 passes through the polarization beam splitter 120, the collimator lens 130, and the ¼ wave plate 140, thereby becoming a circularly-polarized parallel light flux. This light flux is regulated by a diaphragm, and is focused by the objective lens 160 through a transparent base plate 210 of the optical disk 200 onto an information recording surface 220. Then, the light flux is modulated by a information pit and reflected from the information recording surface 220. The reflected light flux passes again through the objective lens 160, the ¼ wave plate 140, and the collimator lens 130, then introduced into the polarization beam splitter 120. The light flux is reflected on the polarization beam splitter 120 and is provided with astigmatism by the cylindrical lens. Thereafter, the light flux is introduced into the optical detecting device 300. A reading signal (a reproducing signal) of information recorded in the optical disk 200 is obtained from a signal outputted from the optical detecting device 300. Further, a change in the light amount distribution due to a change in the shape of the light spot on the optical detecting device 300 is also detected, whereby the focus detection and the truck detection are conducted. That is, by using the output from the optical detecting device 300, a calculation processing circuit (not shown in the drawings) generates a focus error signal and a tracking error signal. The two dimensional actuator 150 for a focus control shifts the objective lens 160 in the optical axis direction on the basis of the focus error signal so as to focus the light flux from the semiconductor laser 110 onto the information recording surface 220 of the optical disk 200. Also, the two dimensional actuator 150 for a tracking control shifts the objective lens 160 in a direction perpendicular to the optical axis so as to focus the light flux from the semiconductor laser 110 at the predetermined truck.

Figure 20:
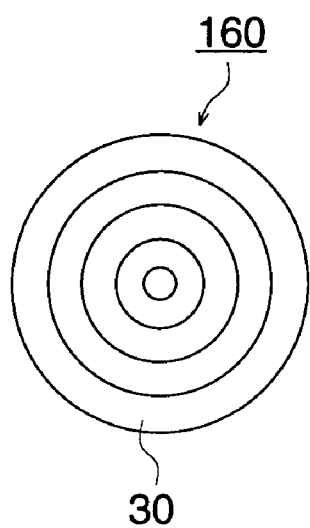
FIGS. 20(a) and 20(b) each is a sectional view showing a objective lens.
Figure 20:
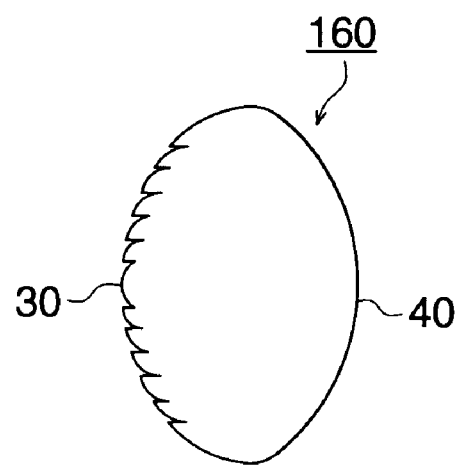

As shown in FIG. 20(b), the objective lens 160 comprises a first surface 30 at its light source side and a second surface 40 at its image side. The first surface 30 is a curved surface, preferably, an aspherical surface and comprises a diffraction surface. Preferably, as shown in FIGS. 20(a) and 20(b), the first surface 30 is provided a concentric ring-shaped blaze type diffraction surface which is a phase type and a relief type. Although the diffraction surface may be provided on a part of the first surface, it may be preferable that the diffraction surface is provided on the entire surface of the first surface 30. The second surface 40 is a curved surface, preferably, an aspherical surface. However, if this lens is used as a near field type objective lens, it may be preferable that the second surface 40 is a flat surface. The diffraction surface may be provided with a shape that a part of the concentric ring is cut out. Further, the diffraction surface may be provided on the second surface 40 without being provided on the first surface 30. Also, the diffraction surface may be provided on both of first surface 30 and the second surface 40. Incidentally, FIGS. 20(a) and 20(b) are illustrated with exaggeration for easy comprehension. Accordingly, FIGS. 20(a) and 20(b) are not illustrated with a precisely reduced scale.

Next, the objective lens of the present invention is explained in detail.

The present invention makes the objective lens to be a diffraction lens on the surface of which diffraction surface is provided. On the diffraction surface, diffraction rings are provided in the form of relief (concave and convex) on the surface of the lens as a base plate. Each ring is shaped in the cross sectional figure of saw tooth and is called as the blazed type.

The present invention compensates a shift of a focusing point of the objective lens made of plastic material due to a change in temperature by providing a proper power on the diffracting surface. Further, this matter is explained with an example. If the temperature raises, since the oscillating wavelength of the semiconductor laser becomes longer, the power on the diffraction surface becomes stronger. Whereby the reduction in the power of the plastic lens due to the temperature raise can be offset.

Hereinafter, the shift of the focal length due to a change in the temperature is explained. Firstly, assuming that the power of the base plate lens is $\psi_B$, the power of the diffraction surface is $\psi_D$, and the power of the entire system is $\psi(\psi=\psi_B+\psi_D)$. The power $\psi_B$ is determined by a refracting power due to the curvature of the lens surface as the base plate on which the diffraction surface is provided.

The power $\psi_D$ of the diffraction surface is characterized by an optical path difference function. The optical path difference function represents a optical path difference added by the diffraction surface and is represented by formula (9).

$$\phi(r)=P_2r+P_4r^4+P_6r^6 \ldots (mm) \qquad (9)$$

Where "r" is a distance from the optical axis.

Assuming that the diffracting order used for recording/reproducing to an optical information recording medium is "m", it may be preferable the ring is provided for each case that the optical path difference mλ is changed by using the optical path difference function.

At this time, assuming that the power of the diffraction surface on the used diffraction order "m" is $\psi_D$ and the diffraction order is "m", $\psi_D$ is represented by the formula (10).

$$\psi_D=-2P_2 \qquad (10)$$

When the diffraction surface is provided on both surfaces, $\psi_D$ is the arithmetic sum of the power of the diffraction surface.

A differential coefficient $d\psi_B/dt$ of the power $\psi_B$ of the base plate lens by the temperature "t" is obtained by the formula (11).

$$\frac{d\psi_B}{dt} = \left(\frac{1}{n-1} \cdot \frac{dn}{dt} + \frac{1}{n-1} \cdot \frac{dn}{d\lambda} \cdot \frac{d\lambda}{dt} - \alpha\right)\psi_B = C_1 \cdot \psi_B \qquad (11)$$

Where, $$C_1: \frac{1}{n-1} \cdot \frac{dn}{dt} + \frac{1}{n-1} \cdot \frac{dn}{d\lambda} \cdot \frac{d\lambda}{dt} - \alpha$$

Incidentally, "n" is a refractive index, "λ" is a wavelength, "α" is a linear expansion coefficient, and assuming that $d\lambda/dt$ represents a change in the oscillating wavelength of the semiconductor laser. Likewise, a differential coefficient $d\psi_D/dt$ of the power $\psi_D$ of the diffraction surface is obtained by the formula (12).

$$\frac{d\psi_D}{dt} = \left(\frac{1}{\lambda} \cdot \frac{d\lambda}{dt} - 2\alpha\right)\psi_D = C_2 \cdot \psi_D \qquad (12)$$

Where, $$C_2: \frac{1}{\lambda} \cdot \frac{d\lambda}{dt} - 2\alpha$$

In order to obtain a change in the focal length due to a change in temperature, assuming that an approximate formula ($\psi = \psi_B + \psi_D$) is used for the power $\psi$ of the entire system and the focal length is "f", a temperature coefficient $df/dt$ of the focal length is obtained by the formula (13) from the relation of $f = 1/\psi$.

$$\frac{df}{dt} = -f^2 \frac{d\psi}{dt} = -f^2 \left(\frac{d\psi_B}{dt} + \frac{d\psi_D}{dt}\right) = -f^2(C_1 \cdot \psi_B + C_2 \cdot \psi_D) \qquad (13)$$

Alternatively, by using $\psi_B = \psi - \psi_D$, it is obtained by the formula (14).

$$\frac{df}{dt} = -f \cdot \left\{C_1 + (C_2 - C_1) \cdot \frac{\psi_D}{\psi}\right\} \qquad (14)$$

$C_1$ and $C_2$ are calculated by using the following example. For example, assuming that $\lambda = 660$ nm, $n = 1.54076$, $dn/dt = -8.3 \times 10^{-5}$, $dn/d\lambda = -36$, $\alpha = 7 \times 10^{-5}$, $d\lambda/dt = 2 \times 10_{-7}$, $C_1 = -2.37 \times 10^{-4}$ and $C_2 = 1.63 \times 10^{-4}$ are obtained. Here, assuming that NA is a numerical aperture at the focusing point side and an allowable amount of the change in the focal length is represented by $\pm \lambda/2NA^2$, a condition that the change in the focal length satisfies the above allowable amount for the temperature change of $\Delta T = \pm 20°$ is obtained by the formula (15).

$$\left| \Delta T \cdot \frac{df}{dt} \right| \leq \frac{\lambda}{2NA^2} \qquad (15)$$

Further, the following formula (16) is obtained.

$$0.59 - \frac{63\psi \cdot \lambda}{NA^2} \leq \frac{\psi_D}{\psi} \leq 0.59 + \frac{63\psi \cdot \lambda}{NA^2} \qquad (16)$$

Observing an error of the approximate formula ($\psi = \psi_B + \psi_D$) the following formula (17) is used as the conditional formula.

$$0.4 - \frac{63\psi \cdot \lambda}{NA^2} \leq \frac{\psi_D}{\psi} \leq 0.8 + \frac{63\psi \cdot \lambda}{NA^2} \qquad (17)$$

As a preferable conditional formula, the following formula (18) is used as the condition for the temperature change of $\Delta T = \pm 30°$.

$$0.4 - \frac{42\psi \cdot \lambda}{NA^2} \leq \frac{\psi_D}{\psi} \leq 0.8 + \frac{42\psi \cdot \lambda}{NA^2} \qquad (18)$$

Further, in the present invention, by providing the diffraction surface at a longer conjugate side, the temperature compensation for the focusing point can be conducted with a small power on the diffraction surface in comparison with the case that the diffraction surface is provided at a shorter conjugate side. Accordingly, a problem such as a difficulty in the productivity caused by the factor that the power on the diffraction surface becomes stronger may hardly occur.

The conditional formula (2) represents a pitch of diffraction rings corresponding to the conditional formula (1). Assuming that the pitch of the diffraction rings in a direction perpendicular to the optical axis is "P" and the diffraction order is "m", P is represented by the following formula (19) by using the optical path difference function.

$$P = \left| \frac{m \cdot \lambda}{\delta \Phi / \delta r} \right| \qquad (19)$$

Assuming that the optical path differential function is approximately represented by only the term of "$r^2$" and $\Phi(r) \neq P_2 \, r^2$, the pitch becomes minimum at a point where the effective radius r is maximum.

Assuming that the minimum pitch is Pmin, Pmin is represented by the following formula (20).

$$P\min \approx \left| \frac{m \cdot \lambda}{2P_2 \cdot r\max} \right| \qquad (20)$$

Assuming that the image forming magnification is "M" ($M \leq 0$), $r\max \neq (1-M) \cdot Na/\psi$, the formula (20) is modified into the formula (21) by using ($\psi_D = -2P_2$).

$$\frac{\psi_D}{\psi} \approx \frac{m \cdot \lambda}{P\min(1-M) \cdot NA} \qquad (21)$$

If this formula is introduced into the conditional formula (1), the following formula (22) is obtained.

$$(1-M)\left(0.4NA - \frac{63\psi \cdot \lambda}{NA}\right) \leq \frac{m \cdot \lambda}{P\min} \leq (1-M)\left(0.8NA + \frac{63\psi \cdot \lambda}{NA}\right) \qquad (22)$$

Considering the error of the approximate formula $\Phi(r) \neq P2 \, r^2_1$ and supposing that a range of M is 0~−0.6, then the formula (23) is obtained.

$$0.2NA - \frac{32\psi \cdot \lambda}{NA} \leq \frac{m \cdot \lambda}{P\min} \leq 2.6NA + \frac{200\psi \cdot \lambda}{NA} \qquad (23)$$

In the present invention, when a diffraction lens in relation to the order number of the used diffracting light is manufactured as a mold lens, if the pitch becomes small to an extent of a size of the edge of a cutter used for manufacturing a mold, the mold manufacture becomes difficult. At such the time, the blazes are formed so as to make the diffraction efficiency the maximum for a diffracting light of specific order number larger than or equal second order, the pitch can be enlarged by the order number times. For example, when the blazes are formed at the diffracting order "m", the pitch of diffraction rings becomes "m" times. Accordingly, this method provides advantage onto the manufacture of the diffraction rings.

EXAMPLE

Hereinafter, the objective lens for the near field type optical disk of the present invention are exemplified.

In the following description, R is a radius of curvature, d is a distance between surfaces, n is a refractive index with the primary wavelength, and νd is Abbe's number. Further, aspherical surface is represented by the formula (24).

$$Z = \frac{h^2/R_0}{1+\sqrt{1-(\kappa+1)h^2/R_0^2}} + \sum_{i=2}^{\infty} A_{2i}h^{2i} \quad (24)$$

The diffraction surface is represented by the formula (25) as the phase difference function.

$$\phi = \sum_{i=1}^{\infty} B_{2i}h^{2i} \quad (25)$$

Here, the unit of the coefficient B is represented with radian.

For example, as shown in Example 1, when $B_2=-488.278$ radian, within the effective radius $h=0.65$, the following formula is formed.

$$\{-488.278\times(0.65)^2\}/2\pi \neq -32.8$$

Accordingly, as rings of the diffraction lens, 32 pieces of rings exist.

Example 1 f=1.0 NA=n sin θ=1.54 (entrance pupil diameter φ=1.30) primary wavelength λ=685 nm

TABLE 1

| Surface No. | R | d | n | νd | cf (nd) |
|---|---|---|---|---|---|
| 1 (aspherical • diffraction surface) | 1.530 | 2.366 | 2.36944 | 12.7 | 2.40892 |
| 2 | ∞ | | | | |

| aspherical surface coefficient | diffraction surface |
|---|---|
| κ = 0.041720 | $-B_2$ = −488.278 radian |
| $A_4$ = −0.0025305 | |
| $A_6$ = 0.0034747 | |
| $A_8$ = −0.025458 | |
| $A_{10}$ = 0.059925 | |
| $A_{12}$ = −0.053488 | |

Figure 1:
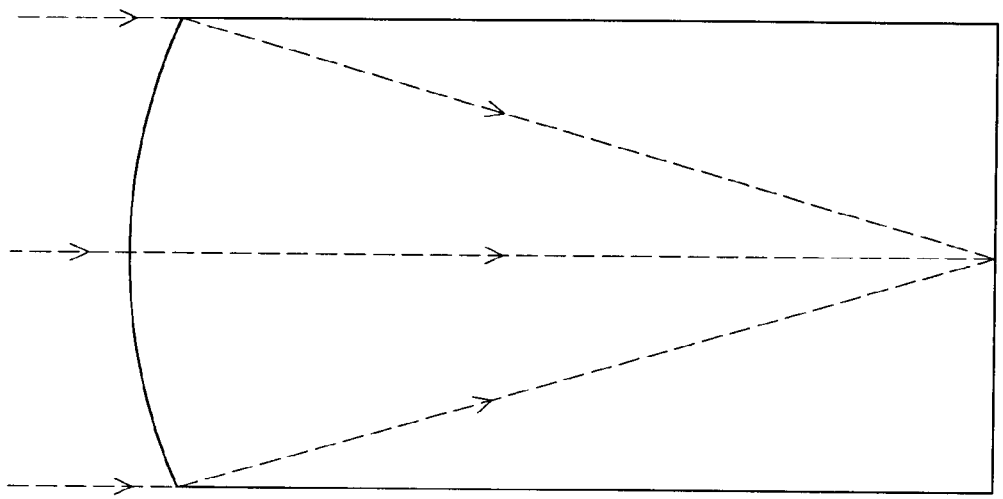
FIG. 1 is a cross sectional view showing a lens in Example 1.
Figure 2:
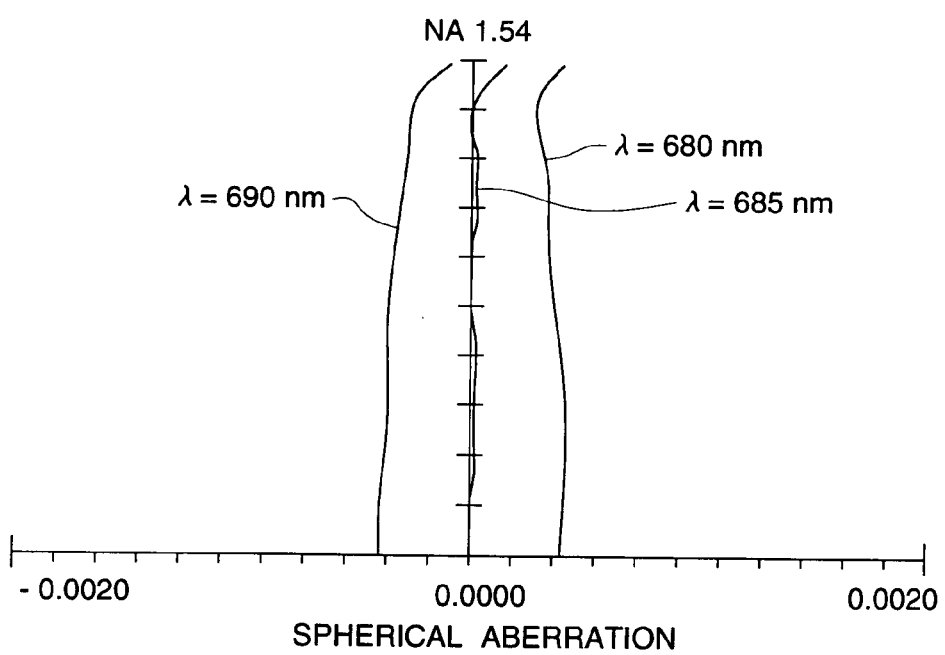
FIG. 2 is a diagram showing spherical aberration in Example 1.
Figure 3:
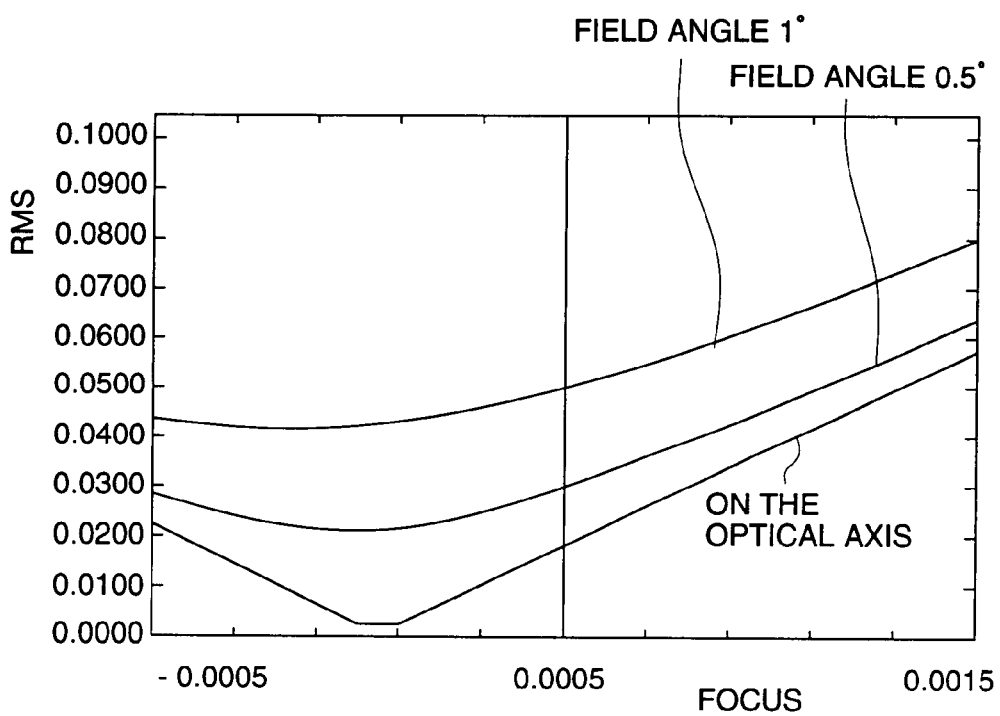
FIG. 3 is a diagram showing wavefront aberration in Example 1.

A cross sectional figure of this lens is shown in FIG. 1, spherical aberration is shown in FIG. 2, and wavefront aberration is shown in FIG. 3.

Example 2 f=1.0 NA=n sin θ=1.19 (entrance pupil diameter φ=1.30) primary wavelength λ=685 nm

TABLE 2

| Surface No. | R | d | n | νd | cf (nd) |
|---|---|---|---|---|---|
| 1 (aspherical • diffraction surface) | 0.920 | 1.828 | 1.83319 | 23.8 | 1.84635 |
| 2 | ∞ | | | | |

| aspherical surface coefficient | diffraction surface |
|---|---|
| κ = −0.046123 | $B_2$ = −444.982 radian |
| $A_4$ = −0.019093 | |
| $A_6$ = −0.024306 | |
| $A_8$ = −0.018808 | |
| $A_{10}$ = −0.010043 | |
| $A_{12}$ = −0.071618 | |

Figure 4:
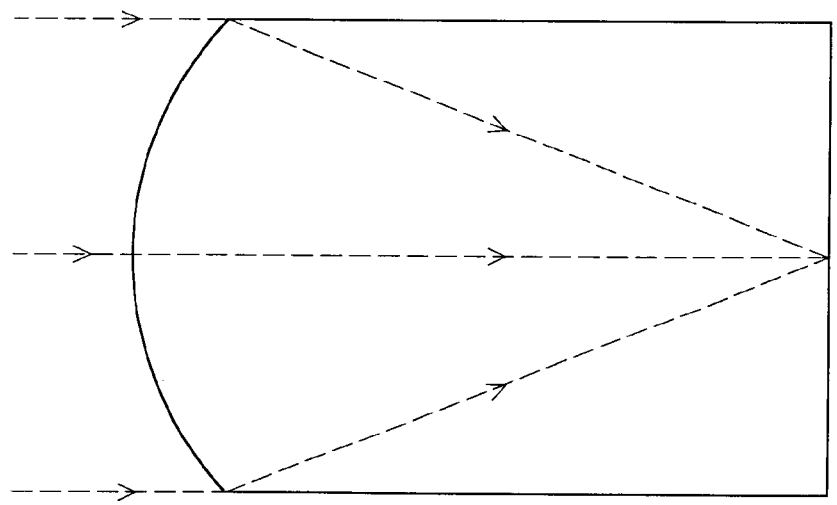
FIG. 4 is a cross sectional view showing a lens in Example 2.
Figure 5:
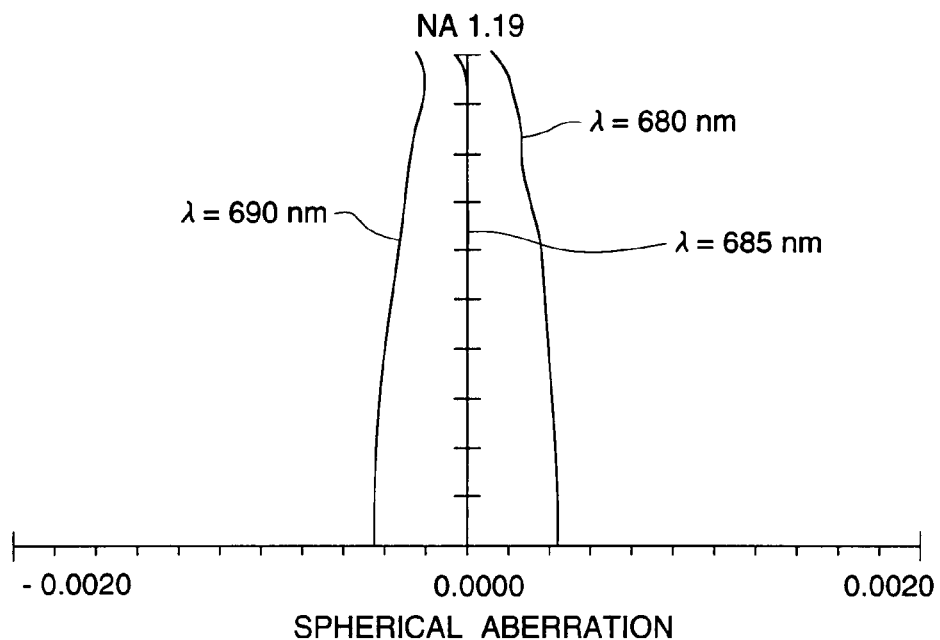
FIG. 5 is a diagram showing spherical aberration in Example 2.
Figure 6:
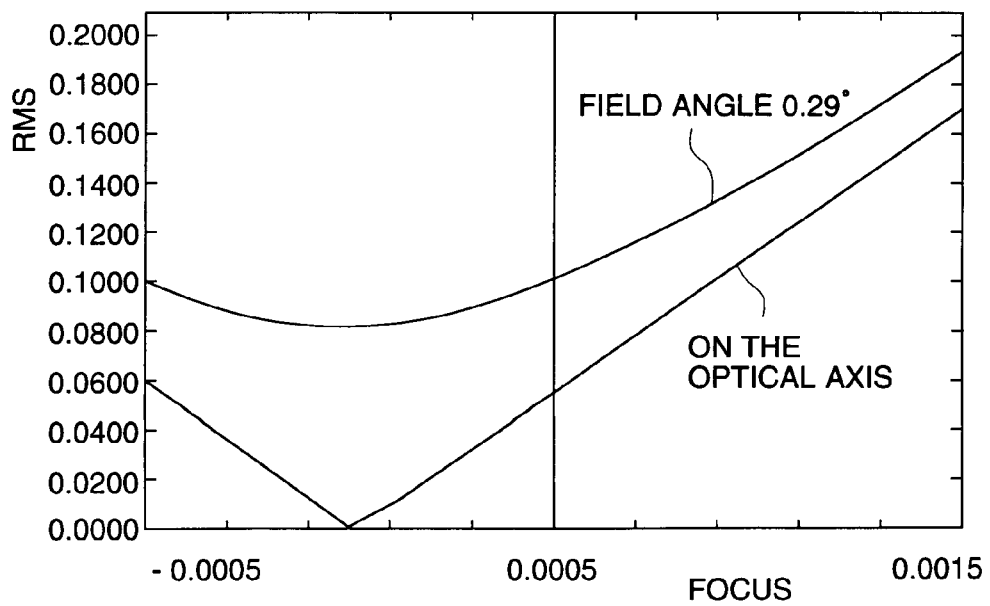
FIG. 6 is a diagram showing wavefront aberration in Example 2.

A cross sectional figure of this lens is shown in FIG. 4, spherical aberration is shown in FIG. 5, and wavefront aberration is shown in FIG. 6.

Example 3 f=1.0 NA=n sin θ=1.19 (entrance pupil diameter φ=1.30) primary wavelength λ=685 nm

TABLE 3

| Surface No. | R | d | n | νd | cf (nd) |
|---|---|---|---|---|---|
| 1 (aspherical • diffraction surface) | 1.430 | 1.828 | 1.83319 | 23.8 | 1.84635 |
| 2 | ∞ | | | | |

| aspherical surface coefficient | diffraction surface |
|---|---|
| κ = 0.42317 | $B_2$ = −1929.37 radian |
| $A_4$ = 0.010123 | |
| $A_6$ = −0.000077666 | |
| $A_8$ = −0.0083469 | |
| $A_{10}$ = 0.10473 | |
| $A_{12}$ = −0.14552 | |

Figure 7:
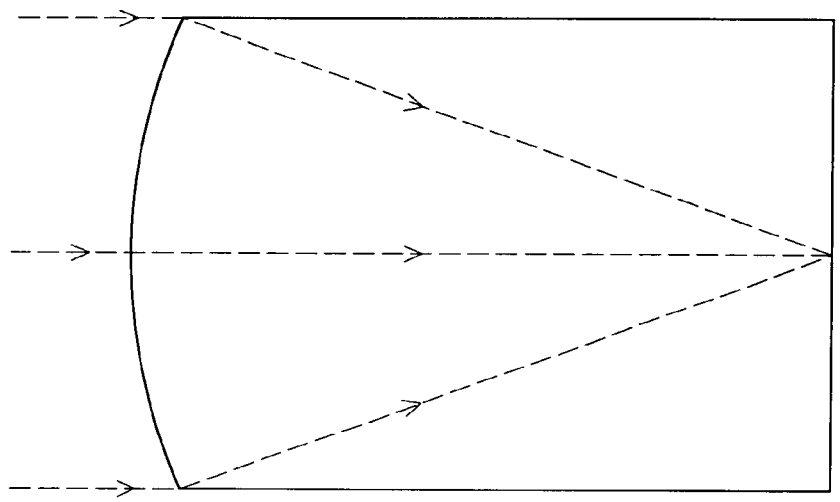
FIG. 7 is a cross sectional view showing a lens in Example 3.
Figure 8:
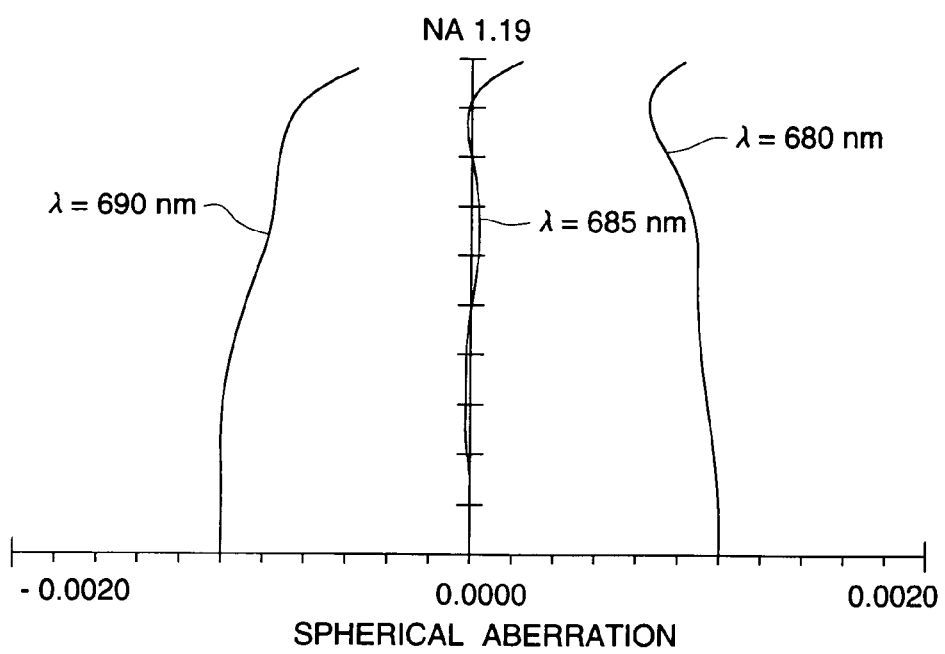
FIG. 8 is a diagram showing spherical aberration in Example 3.
Figure 9:
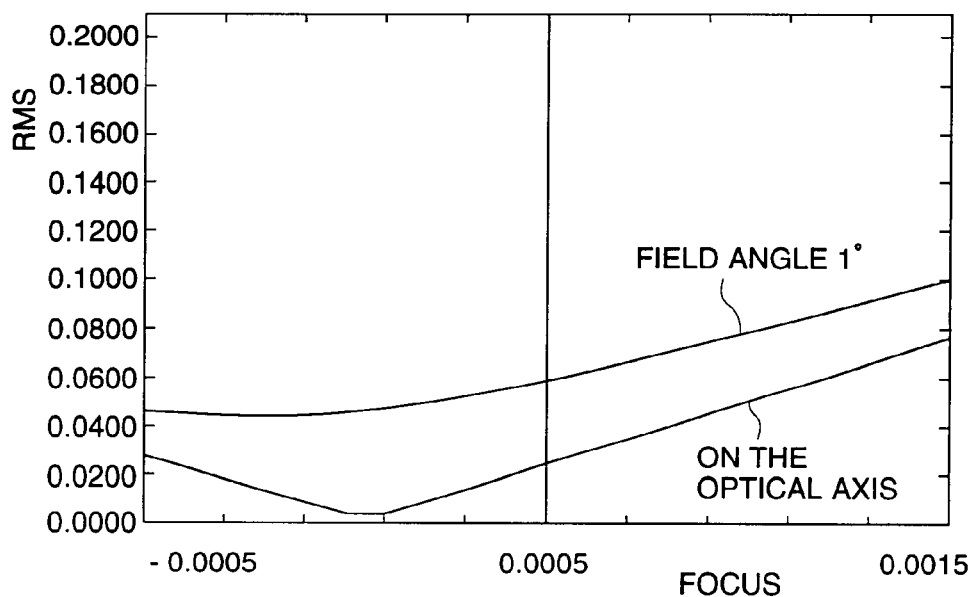
FIG. 9 is a diagram showing wavefront aberration in Example 3.

A cross sectional figure of this lens is shown in FIG. 7, spherical aberration is shown in FIG. 8, and wavefront aberration is shown in FIG. 9.

Example 4 f=1.0 NA=n sin θ=1.03 (entrance pupil diameter φ=1.30) primary wavelength λ=685 nm

TABLE 4

| Surface No. | R | d | n | νd | cf (nd) |
|---|---|---|---|---|---|
| 1 (aspherical • diffraction surface) | 1.38 | 1.5893 | 1.58954 | 39.2 | 1.59551 |
| 2 | ∞ | | | | |

| aspherical surface coefficient | diffraction surface |
|---|---|
| κ = −0.32933 | $B_2$ = −2627.7 radian |
| $A_4$ = −0.076069 | $B_4$ = −828.2 |
| $A_6$ = −0.022412 | |
| $A_8$ = −0.029197 | |
| $A_{10}$ = 0.012852 | |
| $A_{12}$ = −0.022718 | |

Figure 10:
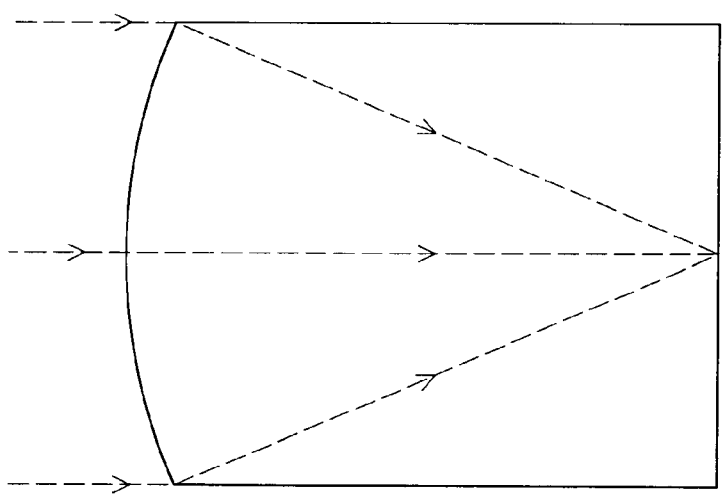
FIG. 10 is a cross sectional view showing a lens in Example 4.
Figure 11:
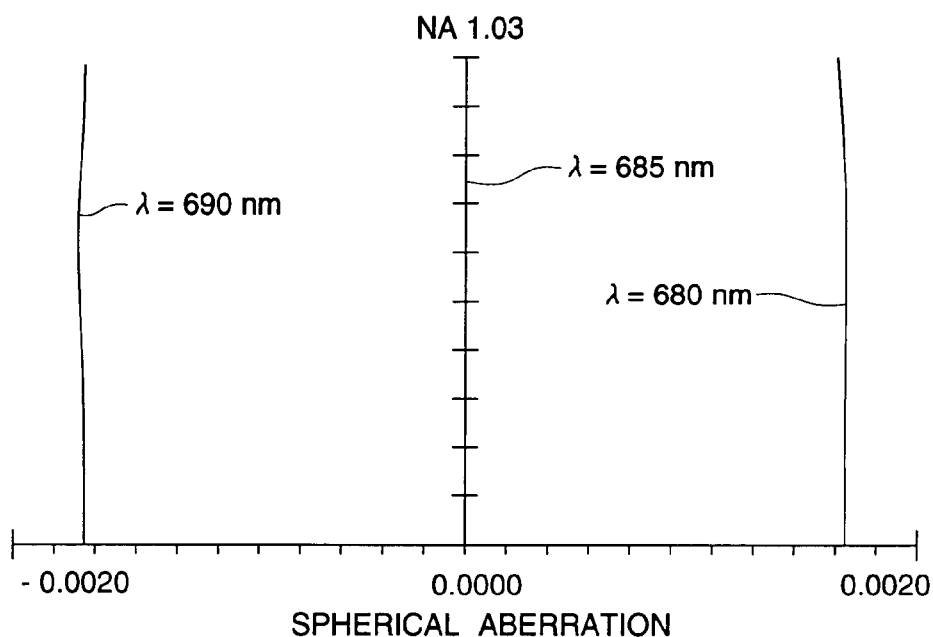
FIG. 11 is a diagram showing spherical aberration in Example 4.
Figure 12:
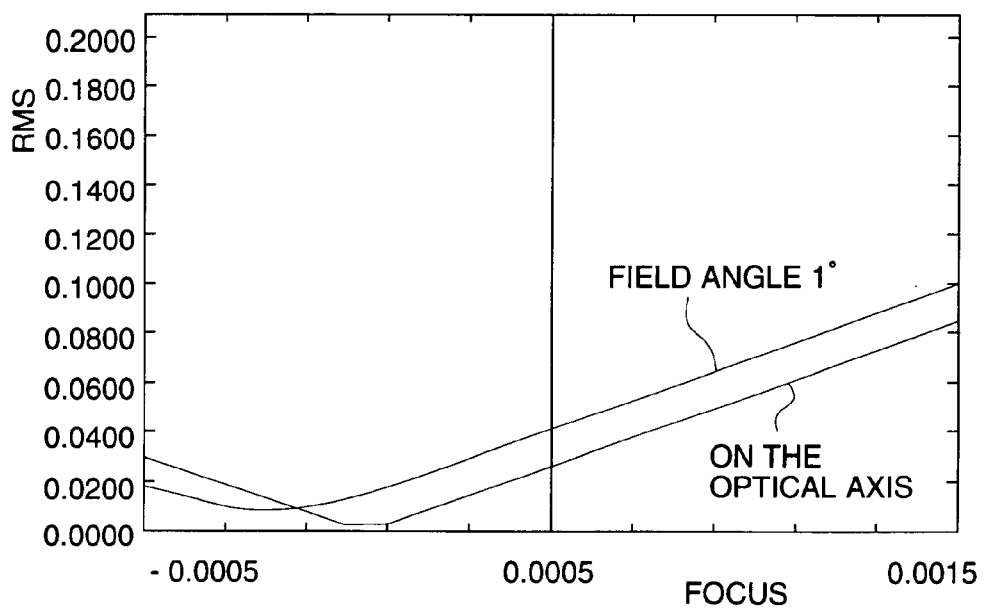
FIG. 12 is a diagram showing wavefront aberration in Example 4.

A cross sectional figure of this lens is shown in FIG. 10, spherical aberration is shown in FIG. 11, and wavefront aberration is shown in FIG. 12.

Data of the above examples corresponding to the conditions of the present invention are as follows.

TABLE 5

| Condition | Example 1 | Example 2 | Example 3 | Example 4 |
|---|---|---|---|---|
| 1 − 1/n | 0.58 | 0.45 | 0.45 | 0.37 |
| $R_0$/d | 0.65 | 0.50 | 0.78 | 0.87 |
| 1 + 1/n | 1.42 | 1.55 | 1.55 | 1.63 |
| $R_0$/(n · f) | 0.65 | 0.50 | 0.78 | 0.87 |
| 0.3 × (1 − 3/νd) | 0.23 | 0.26 | 0.26 | 0.28 |
| (n − 1)/$R_0$ | 0.90 | 0.91 | 0.58 | 0.43 |
| 1/f | 1.0 | 1.0 | 1.0 | 1.0 |
| 1.05 × (1 − 1/n) | 0.61 | 0.47 | 0.47 | 0.39 |
| 0.7 × (1 + 1/n) | 0.99 | 1.08 | 1.08 | 1.14 |
| 0.4 × (1 − 3/νd) | 0.31 | 0.35 | 0.35 | 0.37 |
| 1.2 × (1 − 3/νd) | 0.93 | 1.05 | 1.05 | 1.11 |

Next, hereinafter, a lens for pickup for use in a recording reproducing apparatus with a surface recording method is explained as an example of the present invention with reference to drawings. As defined above, the present invention is not limited to this example. Reference notations used in the example are as follows.

R: radius of curvature of surface
D: thickness of lens on the axis
N: refractive index
λ: wavelength
NA: numerical aperture at image side
m: diffraction order of blazes
ψ: power of the entire system
$ψ_D$: sum of powers of diffraction surfaces at the first surface and the second surface
Pmin: minimum pitch of blazes in a direction perpendicular to the optical axis
r: distance from the optical axis Assuming that X-axis is arranged in the optical axis, Y-axis is arranged in the direction perpendicular to the optical axis, and k, $A_4$, $A_6$, $A_8$, $A_{10}$ are used as aspherical surface coefficient, the shape of aspherical surface is represented by the formula (26).

$$X = \frac{y^2/r}{1+\sqrt{1-(1+K)y^2/r^2}} + A_4 y^4 + A_6 y^6 + A_8 y^8 + A_{10} y^{10} \quad (26)$$

Example 5

Figure 13:
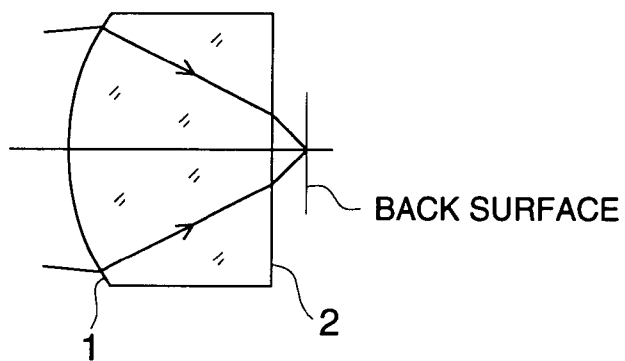
FIG. 13 is a cross sectional view showing an objective lens in Example 5.
Figure 14:
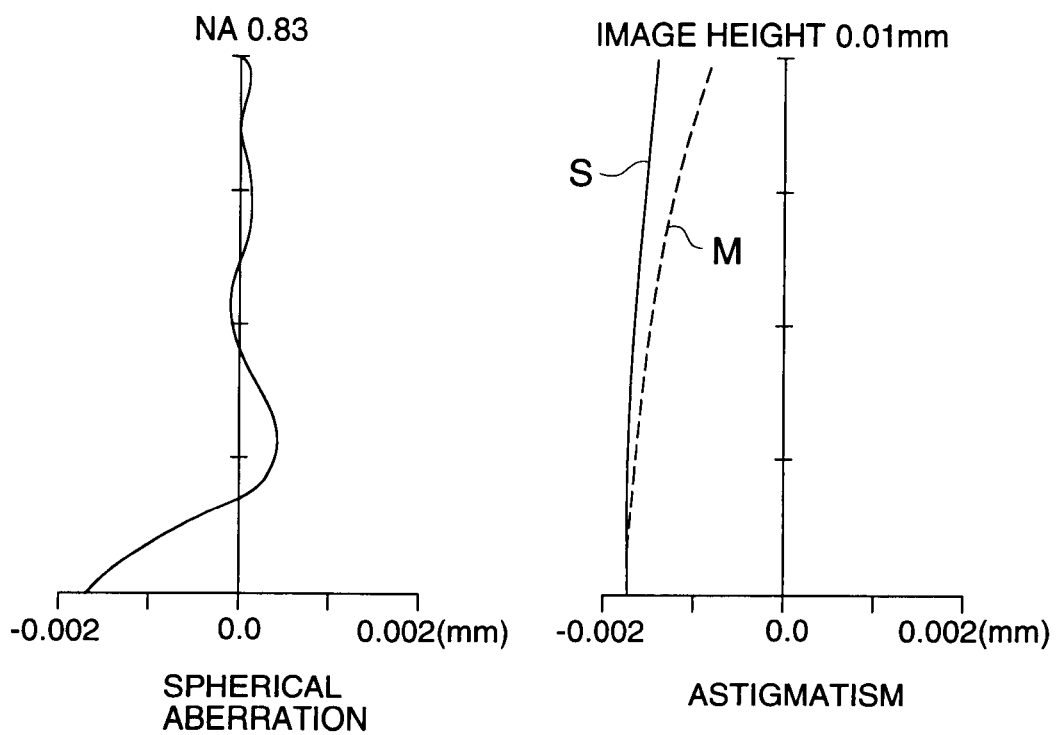
FIG. 14 is a diagram showing aberration in Example 5.

Cross sectional view, at the optical axis, of the objective lens for pickup in Example 5 is shown in FIG. 13, and aberration diagram of the objective lens is shown in FIG. 14. Further, data of the objective lens are shown in Table 6 and Table 7.

TABLE 6

| Surface No. | R | D | N | |
|---|---|---|---|---|
| 1* | 1.6479 | 1.443 | 1.54076 | Diffraction surface |
| 2* | −2.0130 | | | |

| Surface | Aspherical surface coefficient | Surface | Aspherical surface coefficient |
|---|---|---|---|
| First | K = 0.54406 × 10$^{-2}$<br>$A_4$ = 0.26291 × 10$^{-1}$<br>$A_6$ = −0.49207 × 10$^{-1}$ | Second | K = −0.24329 × 10$^4$<br>$A_4$ = −0.17955 × 10<br>$A_6$ = 0.36071 × 10$^2$ |

TABLE 6-continued

| | | |
|---|---|---|
| $A_8$ = 0.95678 × 10$^{-1}$ | | $A_8$ = −0.31542 × 10$^3$ |
| $A_{10}$ = −0.96282 × 10$^{-1}$ | | $A_{10}$ = 0.92080 × 10$^3$ |

Coefficient of optical path difference function $P_2$ = −0.32458
$P_4$ = −0.10016 × 10$^{-1}$
$P_6$ = 0.23722 × 10$^{-1}$
$P_8$ = −0.27003 × 10$^{-1}$ The above first surface is a shape of a base plate surface.
The mark (*) represents aspherical surface.

TABLE 7

| | |
|---|---|
| λ = 660 (mm) | |
| Focal length = 1.0(mm) | |
| Magnification = −0.172 | |
| At image side NA = 0.68 | |
| Image height = ±0.01(mm) | |
| Temperature change | $\frac{dn}{dt} = -8.3 \times 10^{-5}$ |
| | $\frac{dn}{d\lambda} = -36$ |
| | $\alpha = 7 \times 10^{-5}$ |
| | $\frac{d\lambda}{dt} = 2 \times 10^{-7}$ |
| Diffraction surface | Assuming above the change in the optical length for the temperature rise of 20° is 0.0003 (mm).<br>m = 1<br>$ψ_D$ = 0.65<br>$ψ_D/ψ$ = 0.65<br>rmax = 0.83 (mm)<br>Pmin = 0.0012 (mm) |

In Table 6, when the blazes are made based on the diffraction order of 1, the minimum pitch of the blazes is indicated. If the blazes are made based on the diffraction order of m, pitch of diffraction rings becomes m times.

Example 6

Figure 15:
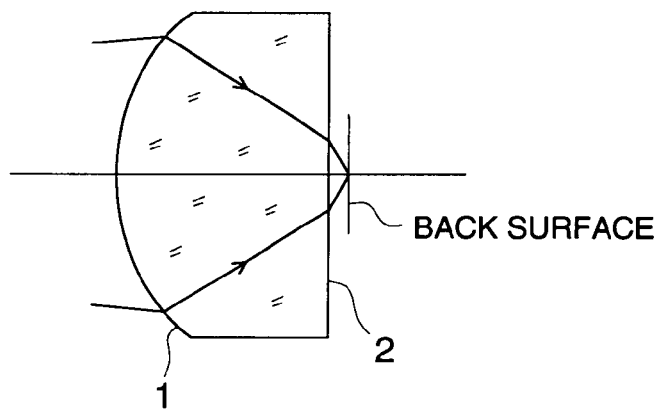
FIG. 15 is a cross sectional view showing an objective lens in Example 6.
Figure 16:
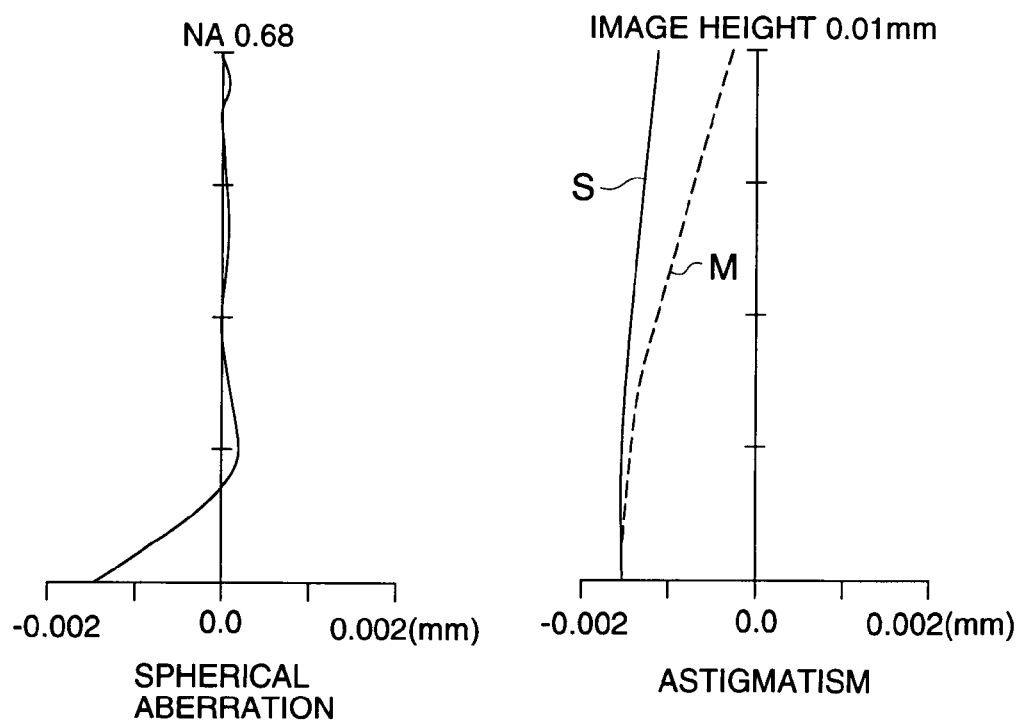
FIG. 16 is a diagram showing aberration in Example 6.

Cross sectional view, at the optical axis, of the objective lens for pickup in Example 6 is shown in FIG. 15, and aberration diagram of the objective lens is shown in FIG. 16. Further, data of the objective lens are shown in Table 8 and Table 9.

TABLE 8

| Surface No. | R | D | N | |
|---|---|---|---|---|
| 1* | 1.7433 | 1.507 | 1.54076 | Diffraction surface |
| 2* | −3.8814 | | | |

| Surface | Aspherical surface coefficient | Surface | Aspherical surface coefficient |
|---|---|---|---|
| First | K = 0<br>$A_4$ = 0.10617 × 10$^{-1}$<br>$A_6$ = −0.33430 × 10$^{-2}$<br>$A_8$ = 0.21647 × 10$^{-1}$<br>$A_{10}$ = 0.33689 × 10$^{-2}$ | Second | K = −0.67615 × 10$^5$<br>$A_4$ = 0.16669<br>$A_6$ = −0.41103 × 10<br>$A_8$ = 0.33573 × 10$^2$<br>$A_{10}$ = −0.87030 ' 10$^2$ |

TABLE 8-continued

Coefficient of optical path difference function $P_2 = -0.34313$
$P_4 = -0.10299 \times 10^{-1}$
$P_6 = 0.15558 \times 10^{-2}$
$P_8 = 0.61696 \times 10^{-2}$ The above first surface is a shape of a base plate surface.
The mark (*) represents aspherical surface.

TABLE 9

| | |
|---|---|
| $\lambda = 660$ (nm) | |
| Focal length = 1.0 (mm) | |
| Magnification = −0.142 | |
| NA = 0.83 | |
| Image height = ±0.01 (mm) | |
| Temperature change | Under the same condition as that in Example 1, the change in the optical length for the temperature rise of 20° is −0.0003 (mm). |
| Diffraction surface | m = 1 |
| | $\psi_D = 0.69$ |
| | $\psi_D/\psi = 0.69$ |
| | rmax = 1.01 (mm) |
| | Pmin = 0.0010 (mm) |

In Table 8, when the blazes are made based on the diffraction order of 1, the minimum pitch of the blazes is indicated. If the blazes are made based on the diffraction order of m, pitch of diffraction rings becomes m times.

Here, the relationship with the above conditional formula (1) and conditional formula (2) is indicated in Table 10.

TABLE 10

| | | Example 5 | Example 6 |
|---|---|---|---|
| Conditional formula (1) | $0.4 - \dfrac{63\varphi \cdot \lambda}{NA^2}$ | 0.31 | 3.34 |
| | $\dfrac{\varphi D}{\varphi}$ | 0.65 | 0.69 |
| | $0.8 + \dfrac{63\varphi \cdot \lambda}{NA^2}$ | 0.89 | 0.86 |
| Conditional formula (2) | $0.2NA - \dfrac{32\varphi \cdot \lambda}{NA}$ | 0.10 | 0.14 |
| | $\dfrac{m \cdot \lambda}{P\,min}$ | 0.55 | 0.66 |
| | $2.6NA + \dfrac{200\varphi \cdot \lambda}{NA}$ | 1.96 | 2.32 |

As shown in Table 10, each example satisfies the conditional formula.

As stated above, in the optical system for the near field type optical disk, although the objective lens is a single lens shaped in a flat convex lens, the function to convert the incident light flux into a converged light flux is allotted not only to the refracting power, but also to the diffracting power, whereby the curvature of the convex surface can be loosened and the sine condition is made proper. As a result, a good image forming performance can be obtained not only for light flux on the optical axis, but also even for a light flux in a field angle of ±1°. In addition, by utilizing large dispersion of the diffraction surface, since chromatic aberration can be additionally corrected, the present invention may provide greater effect for putting the optical system for the near field type optical disk into practical use.

Further, since the structure is made as stated above, according to the objective lens of the present invention for pickup, the objective lens made of plastic material in which shift in the focusing point due to a change in temperature is small can be obtained. Disclosed embodiment can be varied by a skilled person without departing from the spirit and scope of the invention.

What is claimed is:

1. A near field type optical disk recording and/or reproducing apparatus, comprising:
   a light source;
   an objective single lens to converse light from the light source to a focusing point;
   an optical disk; and
   a rotating device to rotate the optical disk,
   wherein the objective lens has a first surface at the light source side and a second surface at the focusing point side, and the first surface is a curved surface on which a diffraction surface is provided, and
   wherein the following formula is satisfied, $(1-1/n) < R_0/d < (1+1/n)$ wherein n is a refractive index of the objective lens, $R_0$ is a paraxial curvature radius of the objective lens, and d is a thickness of the objective lens on the optical axis.

2. The near field type optical disk recording and/or reproducing apparatus of claim 1, wherein the first surface is an aspherical surface.

3. The near field type optical disk recording and/or reproducing apparatus of claim 1, wherein the second surface is a flat surface.

4. The near field type optical disk recording and/or reproducing apparatus of claim 1, wherein the diffraction surface is notched in a form of a ring.

5. The near field type optical disk recording and/or reproducing apparatus of claim 1, wherein the following formula is satisfied, $vd < 40$ where $v\,d$ is Abbe's number of the objective lens.

6. The near field type optical disk recording and/or reproducing apparatus of claim 1, further comprising a collimator lens, chromatic aberration of the objective lens is corrected excessively and chromatic aberration of the collimator lens is corrected insufficiently, whereby chromatic aberration of the entire optical system is corrected properly.

7. A near field type optical disk recording and/or reproducing apparatus, comprising:
   a light source;
   an objective single lens to converse light from the light source to a focusing point;
   an optical disk; and
   a rotating device to rotate the optical disk,
   wherein the objective lens has a first surface at the light source side and a second surface at the focusing point side, and the first surface is a curved surface on which a diffraction surface is provided, and
   wherein the following formula is satisfied, $(1-1/n) < R_0/(n \cdot f) < (1+1/n)$ wherein n is a refractive index of the objective lens, $R_0$ is a paraxial curvature radius of the objective lens, and f is a focal length of the objective lens.

8. The near field type optical disk recording and/or reproducing apparatus of claim 6, wherein the first surface is an aspherical surface.

9. The near field type optical disk recording and/or reproducing apparatus of claim 7, wherein the second surface is a flat surface.

10. The near field type optical disk recording and/or reproducing apparatus of claim 7, wherein the diffraction surface is notched in a form of a ring.

11. The near field type optical disk recording and/or reproducing apparatus of claim 7, wherein the following formula is satisfied, $$\nu d < 40$$

where $\nu$ d is Abbe's number of the objective lens.

12. The near field type optical disk recording and/or reproducing apparatus of claim 7, further comprising a collimator lens, chromatic aberration of the objective lens is corrected excessively and chromatic aberration of the collimator lens is corrected insufficiently, whereby chromatic aberration of the entire optical system is corrected properly.

13. A near field type optical disk recording and/or reproducing apparatus, comprising:
a light source;
an objective single lens to converse light from the light source to a focusing point;
an optical disk; and
a rotating device to rotate the optical disk,
wherein the objective lens has a first surface at the light source side and a second surface at the focusing point side, and the first surface is a curved surface on which a diffraction surface is provided, and
wherein the following formula is satisfied, $$0.3 \times (1-3/\nu d) < (n-1)/R_0 < 1f$$

where n is a refractive index of the objective lens, $R_0$ is a paraxial curvature radius of the objective lens, f is a focal length of the objective lens, and $\nu$ d is Abbe's number of the objective lens.

14. A near field type optical disk recording and/or reproducing apparatus, comprising:
a light source; an objective single lens to converse light from the light source to a focusing point;
an optical disk; and
a rotating device to rotate the optical disk,
wherein the objective lens has a first surface at the light source side and a second surface at the focusing point side, and the first surface is a curved surface on which a diffraction surface is provided, and
wherein the following formula is satisfied, $$0.4 \times (1-3/\nu d) < (n-1)/R_0 < 1.2 \times (1-3/\nu d)$$

where n is a refractive index of the objective lens, $R_0$ is a paraxial curvature radius of the objective lens, f is a focal length of the objective lens, and $\nu$ d is Abbe's number of the objective lens.

15. A pickup apparatus for use in a near field type optical disk recording and/or reproducing apparatus, comprising:

a light source; and
an objective single lens to converse light from the light source to a focusing point;
wherein the objective lens has a first surface at the light source side and a second surface at the focusing point side, and the first surface is a curved surface on which a diffraction surface is provided,
wherein the following formula is satisfied, $$(1-1/n) < R_0/d < (1-1/n)$$

wherein n is a refractive index of the objective lens, $R_0$ is a paraxial curvature radius of the objective lens, and d is a thickness of the objective lens on the optical axis.

16. objective lens for use in a near field type optical disk recording and/or reproducing apparatus, wherein the objective single lens converses light from a light source to a focusing point, comprising:
a first surface at the light source side, and
a second surface at the focusing point side,
wherein the first surface is a curved surface on which a diffraction surface is provided,
wherein the following formula is satisfied, $$(1-1/n) < R_0/d < (1+1/n)$$

wherein n is a refractive index of the objective lens, $R_0$ is a paraxial curvature radius of the objective lens, and d is a thickness of the objective lens on the optical axis.

17. An optical information recording medium recording and/or reproducing apparatus, comprising:
a light source; and
a objective lens of a single lens to converse light from the light source to a focusing point;
wherein the objective lens is made of plastic and comprises a first surface and a second surface opposite to the first surface, and at least one of the first surface and the second surface includes a diffraction surface, and
wherein the objective lens satisfies the following formula:

$$0.4 - (63\psi \cdot \lambda/NA^2) \leq \psi_D/\psi \leq 0.8 + (63\psi \cdot \lambda/NA^2)$$

where $\psi$ is a power of the entire system of the objective lens, $\psi_D$ is the sum of the power of the diffraction surface of the first surface and the power of the diffraction surface of the second surface, $\lambda$ is a wavelength of the light source, and NA is a numerical aperture at the image side of the objective lens.

18. The optical information recording medium recording and/or reproducing apparatus of claim 17, wherein the diffraction surface is notched in the form of a ring.

19. The optical information recording medium recording and/or reproducing apparatus of claim 17, wherein the diffraction surface is a blazed type diffraction surface.

20. The optical information recording medium recording and/or reproducing apparatus of claim 19, wherein the numerical aperture at the image side of the objective lens is larger than 0.5, the diffraction surface is provided at the longer conjugate side, and the following formula is satisfied:

$$0.2NA - (32\ \psi \cdot \lambda/NA) \leq m \cdot \lambda P_{min} \leq 2.6NA + (200\psi \cdot \lambda/NA)$$

where $P_{min}$ is the minimum pitch of the blazeds of the objective lens in a direction perpendicular to the optical axis, and m is a diffraction order of the blazeds.

21. The optical information recording medium recording and/or reproducing apparatus of claim 19, wherein the diffraction surface is shaped in the form of blazeds such that the diffraction efficiency becomes the largest for the diffracting light having an order number larger than or equal to the second order.

22. A pickup apparatus for use in an optical information recording medium recording and/or reproducing apparatus, comprising:

a light source; and a objective lens of a single lens to converse light from the light source to a focusing point;

wherein the objective lens is made of plastic and comprises a first surface and a second surface opposite to the first surface, and at least one of the first surface and the second surface includes a diffraction surface, and wherein the objective lens satisfies the following formula:

$$0.4-(63\ \psi\cdot\lambda/NA^2) \leq \psi_D/\psi \leq 0.8+(63\psi\cdot\lambda/NA^2)$$

where $\psi$ is a power of the entire system of the objective lens, $\psi_D$ is the sum of the power of the diffraction surface of the first surface and the power of the diffraction surface of the second surface, $\lambda$ is a wave length of the light source, NA is a numerical aperture at the image side of the objective lens.

23. An objective lens for use in an optical information recording medium recording and/or reproducing apparatus, comprising:

a objective lens having a first surface and a second surface opposite to the first surface;

wherein the objective lens is made of plastic and at least one of the first surface and the second surface includes a diffraction surface, and wherein the objective lens satisfies the following formula:

$$0.4-(63\psi\cdot\lambda/NA^2) \leq \psi_D/\psi \leq 0.8+(63\psi\cdot\lambda/NA^2)$$

where $\psi$ is a power of the entire system of the objective lens, $\psi_D$ is the sum of the power of the diffraction surface of the first surface and the power of the diffraction surface of the second surface, $\lambda$ is a wavelength of the light source, NA is a numerical aperture at the image side of the objective lens.

24. A pickup apparatus for use in a near field type optical disk recording and/or reproducing apparatus, comprising: a light source; and an objective single lens to converse light from the light source to a focusing point;

wherein the objective lens has a first surface at the light source side and a second surface at the focusing point side, and the first surface is a curved surface on which a diffraction surface is provided, wherein the following formula is satisfied, $$(1-1/n) < R_0/(n \cdot f) < (1+1/n)$$

wherein n a refractive index of the objective lens, $R_0$ is a paraxial curvature radius of the objective lens, and f is a focal length of the objective lens.

25. An objective lens for use in a near field type optical disk recording and/or reproducing apparatus, wherein the objective single lens converses light from a light source to a focusing point, comprising:

a first surface at the light source side, and a second surface at the focusing point side, wherein the first surface is a curved surface on which a diffraction surface is provided, wherein the following formula is satisfied, $$(1-1/n) < R_0/(n \cdot f) < 1+1/n)$$

wherein n is a refractive index of the objective lens, $R_0$ is a paraxial curvature radius of the objective lens, and f is a focal length of the objective lens.

* * * * *